Aug. 15, 1939 W. ZAPP 2,169,548
ROLL FILM CAMERA
Filed Dec. 6, 1937 2 Sheets-Sheet 1
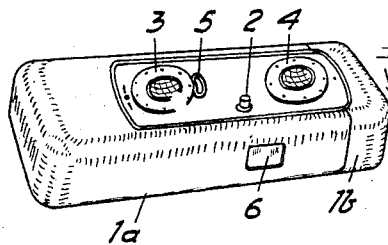
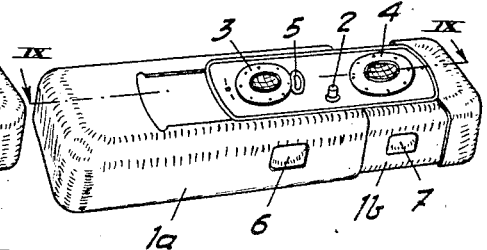
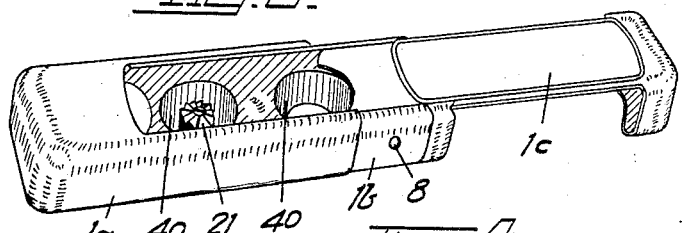
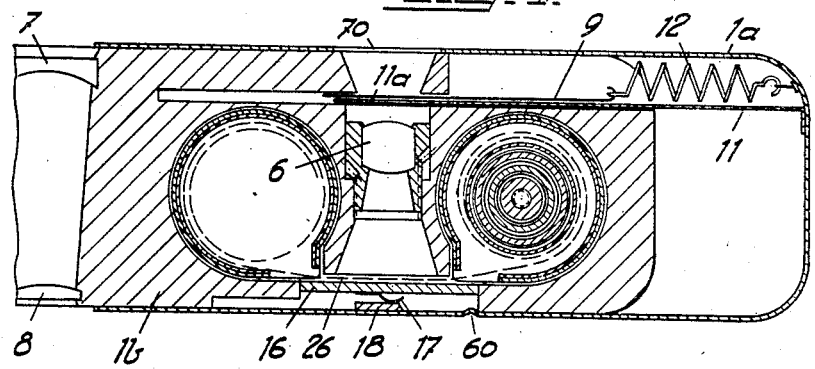
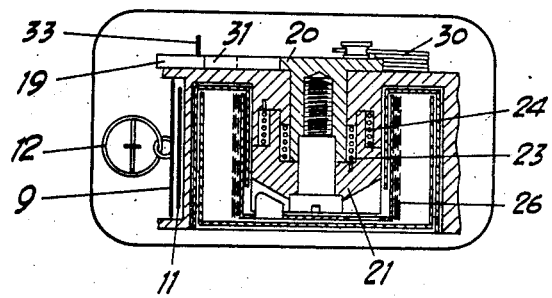
Inventor
Walter Zapp.
By Sommers + Young
Attys Aug. 15, 1939  W. ZAPP  2,169,548
ROLL FILM CAMERA
Filed Dec. 6, 1937  2 Sheets-Sheet 2
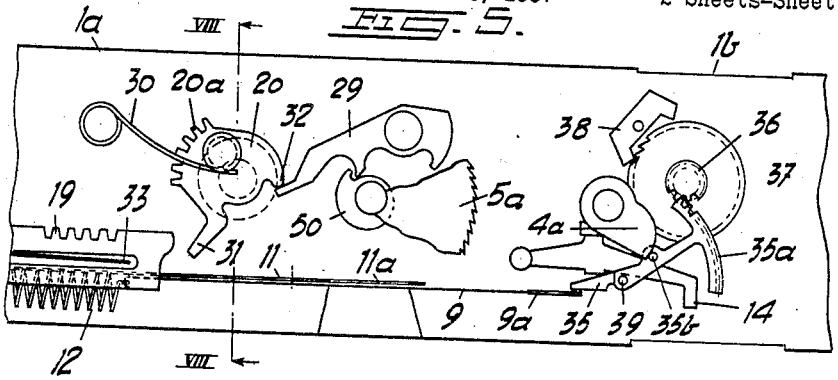
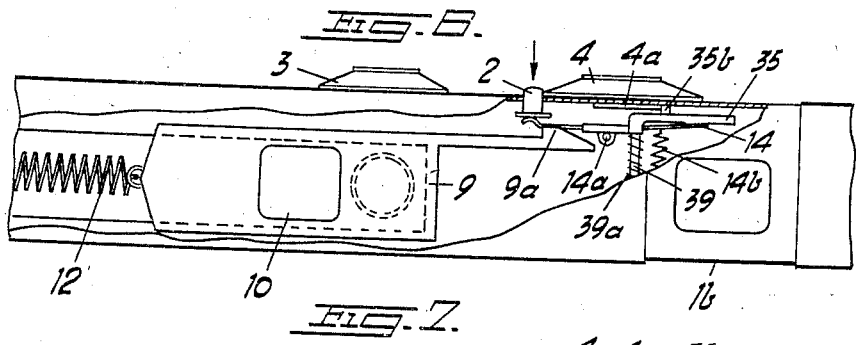
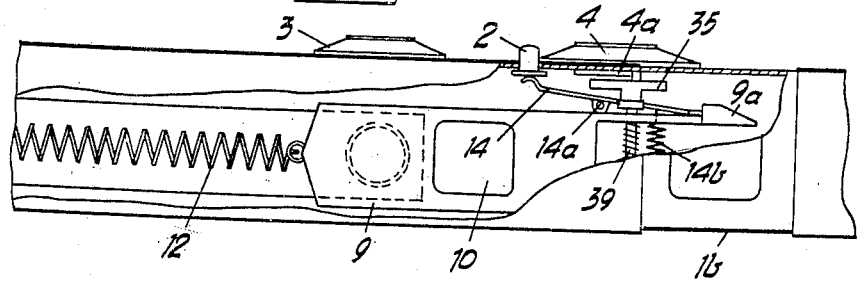
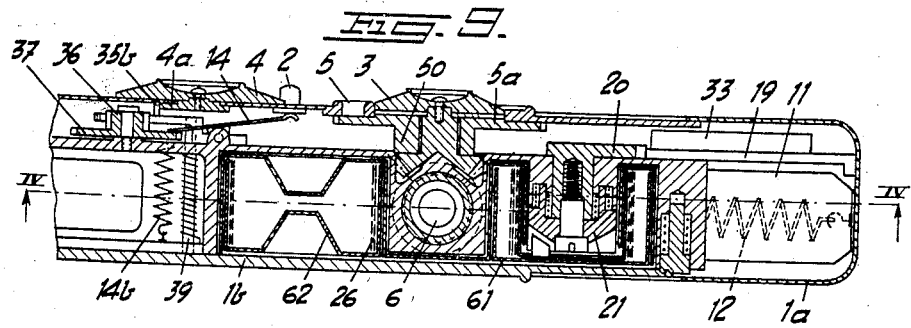
Inventor
Walter Zapp
By Sommers & Young
Attys Patented Aug. 15, 1939

2,169,548

UNITED STATES PATENT OFFICE 2,169,548

ROLL FILM CAMERA

Walter Zapp, Riga, Latvia, assignor to Valsts Elektrotechnika Fabrika, Riga, Latvia, a company of Latvia Application December 6, 1937, Serial No. 178,389
In Finland December 22, 1936

5 Claims. (Cl. 95—31)

The present invention relates to photographic apparatus.

One object of the invention is to create a photographic apparatus of such small dimensions that it may be carried in the vest pocket.

Another object of the invention is to provide a photographic apparatus which may be manipulated very quickly and by means of which a plurality of successive exposures may be made rapidly.

Another object of the invention is to construct the apparatus in such manner that protruding portions are avoided as much as possible. More particularly the usual rotatable handle for feeding the film is eliminated.

Another object of the invention is to construct the apparatus in such manner that the lens and the view-finder are protected when the apparatus is not used.

One embodiment of the invention is shown in the annexed drawings.

Fig. 1 is a perspective view showing the photographic apparatus according to the present invention, in normal position.

Fig. 2 is a perspective view showing the same apparatus in an extended position, ready for use.

Fig. 3 is a perspective view showing the same apparatus from the lower side, the lower wall being pulled out still further to uncover the chambers for the film.

Fig. 4 is a longitudinal section through the same apparatus on a larger scale, taken along the line IV—IV in Fig. 9.

Fig. 5 is a plan view showing the upper side of the apparatus, the upper wall being broken away.

Fig. 6 is a corresponding front view partly in section.

Fig. 7 is the same front view but shows the elements in another position.

Fig. 8 is a cross section taken on the line VIII—VIII in Fig. 5.

Fig. 9 is a longitudinal section taken on the line IX—IX in Fig. 2.

Figs. 5 to 7 are on a larger scale than Fig. 4, and Fig. 8 is on a still larger scale. Fig. 9 is in the same scale as Fig. 4.

Referring now to the drawings, the casing of the apparatus is formed by two bodies indicated by reference characters $1a$ and $1b$. The two bodies $1a$ and $1b$ are of an oblong shape and the latter is movable in the former in the longitudinal direction. The relative motion of the bodies in the direction from each other is limited by a suitable stop 60 (Fig. 4). The exterior of the apparatus is shown in Figs. 1 and 2. In these figures numeral 2 indicates a button by which the shutter mechanism is released. Numeral 3 designates a graduation for setting the lens to different distances, while numeral 4 indicates a graduation for setting the time of exposure (the speed of the shutter movement). Reference numeral 5 designates a window for viewing a graduated disc which indicates the number of pictures exposed. Numeral 6 indicates a lens and 7 refers to a view finder. The lower side and the rear side of the apparatus in extended position are shown in Fig. 3. In this figure the ocular of the view-finder is indicated by numeral 8. Moreover, in this figure the lower side of the inner body $1b$ is uncovered, as the cover $1c$ is drawn out, so that the chambers 40 for the film rollers as well as a coupling member 21 for rotating one of said rollers are visible.

The shutter mechanism is operated when the two bodies of the casing are drawn apart and pushed together. The shutter consists of a thin sheet metal strip 9 which is connected with the outer body $1a$ by means of a spring 12. The shutter 9 is slideably mounted in a slot in the inner body $1b$ and has an opening 10 movable past the lens 6. The shutter 9 has an extension formed with a hook $9a$. By means of this hook the shutter 9 cooperates with a catch lever 14 mounted on a pin $14a$ in the inner body $1b$ and carrying the button 2. A tension spring $14b$ is connected to the lever 14 in such manner that the left end of the lever is yieldingly pressed upwards (Fig. 6). The shutter 9 also cooperates with a retarding mechanism located in the inner body $1b$ and comprising a retarding lever 35 mounted upon a pin 39. A torsional spring $39a$ surrounding the pin 39, is connected to the lever 35 in such manner that it tends to turn the lever 35 in a counter-clockwise direction (Fig. 5). This lever 35 carries a toothed segment $35a$ engaging a gear wheel 36 secured on a toothed wheel 37 cooperating with a double pawl 38. The wheel 36 and the pawl 38 form a mechanism of the well-known clock escapement type. The lever 35 carries a pin $35b$ projecting through the upper wall of the body $1b$ and arranged in such manner that it may be engaged by a cam $4a$ secured to the member carrying the graduation 4 for the time. Between the shutter 9 and the lens 6 a plate 11 is located which is secured to the outer body $1a$ and serves to prevent the lens from being uncovered when the two bodies of the casing of the apparatus are moved together to its shut position.

The device now described acts as follows:

Assuming that the apparatus is shut, then the hook 9a of the shutter 9 is engaged by the catch lever 14. When the apparatus is extended, that is when the inner body 1b is moved outwards in the outer body 1a to the position shown in Fig. 2, the shutter 9 is also moved in the same direction as the inner body 1b, tensioning the spring 12. When the apparatus has attained its most extended position the plate 11 presents an opening 11a in front of the lens 6. However, the opening 10 in the shutter 9 does not lie in front of the lens but beside the same, as shown in Fig. 7. Thus, in this position the lens 6 is covered. If, now, the button 2 is depressed the shutter 9 is released and moves over the lens 6, which will be exposed to the light when the opening 10 of the shutter passes the opening 11a. Then the shutter 9 has attained its position of rest, the lens 6 again is covered, as shown in Fig. 6. Then the apparatus may be shut. During this motion the opening 10 in the shutter 9 would uncover the lens if the plate 11, which covers the lens during the movement of the opening 10 past the lens 6, were not provided.

In Fig. 5 the retarding mechanism for the shutter is shown in the position corresponding to the shortest time of exposure. When the picture is to be exposed for a longer time the cam 4a is turned in a clockwise direction, and for the following description it is to be assumed that the cam 4a is directed more downwardly than in Fig. 5. This figure illustrates the lever 35 and the shutter 9 in their positions after the releasing of the latter. In these positions the hook 9a prevents the lever 35 from being swung into engagement with the cam 4a by the torsional spring 39a. When the apparatus is pushed together the left end of the lever 35 is disengaged from the hook 9a and is swung counter-clockwise by the spring 39a, and simultaneously the wheels 36, 37 are rotated clockwise by the sector 35a of the lever 35 until the rotation is stopped by the engagement of the pin 35b with the cam 4a. This is the initial position of the retarding mechanism and this initial position is determined by the position to which the cam 4a was set. When the apparatus now is extended nothing occurs but the tensioning of the shutter 9 which in the normal position of the apparatus had become engaged by the catch lever 14. Upon disengagement of the lever 14 by depression of the button 2 the shutter 9 moves freely to the left until it engages the left end of the lever 35 which then is swung in a clockwise direction from the engagement with the cam 4a until the lever 35 has attained the position shown in Fig. 5. During this turning motion the lever rotates the wheels 36, 37 in a counter-clockwise direction, and the speed of rotation of the wheels is controlled by the double pawl 38 in well-known manner, and the lens is uncovered by opening 10. Then the shutting motion of the shutter is completed and the lens is covered. Now, the apparatus may be pushed together so that the lever 35 is swung into engagement with the cam 4a. It is evident that the time during which the lens is uncovered depends on the position from which the lever 35 begins its rotation in a clockwise direction.

It is evident that the reciprocating motion operates the shutter mechanism, that is tensions the shutter spring. Furthermore, the feeding of the film is also effected by this reciprocating motion. For this purpose to the right end of the outer body 1a (Fig. 9) a member 19 is attached which in the embodiment shown is formed as a rack. In the inner body 1b the film rollers 61 and 62 are located in the chambers 40 (Figs. 3 and 9). The film feeding roller 61 is connected to a plate 20 rotatably mounted in the inner body 1b by means of a coupling member 21 and a unidirectional feeding-and-stop pawl mechanism 23, 24. This plate 20 has a toothed portion 20a and an arm 31 for cooperation with the rack 19. Also a returning spring 30 for said plate 20 is provided. The starting position of the plate 20 is defined by a lever 29 engaging a projection 32 on the plate 20 and operated in such manner that at the feeding of the film due compensation for the increase of the diameter of the film roll will be attained. For this purpose a helical cam 50 attached to the disc 5a counting the number of pictures exposed cooperates with said lever 29, and a spring plate 33 is secured to said member 19 which plate 33 serves to turn the disc 5a by means of a step-by-step motion. When the apparatus is shut the member 19 feeds the film and also operates the disc 5a thus causing a compensation for the increase in diameter of the film roll. When the apparatus is extended the film feeding mechanism is brought into position for the next feeding of the film. This mechanism for feeding the film and for compensating for the increase of diameter of the film roll is further described and claimed in my co-pending patent application entitled, Improvements in film feeding mechanism for photographic apparatus and filed on the same date as my present application. Some features shown and claimed in that application are also shown and described in the present application.

When the apparatus is shut, that is, pushed together, the lens 6 as well as the view-finder 7 together with the ocular 8 are protected by portions of the outer body 1a (Fig. 4). Only in extended position are the lens and the view-finder uncovered, the lens by an opening 70 in said portion of the body 1a and the view-finder on account of the fact that it then lies outside the outer body 1a (see also Fig. 2). Thus, the lens and the view-finder are uncovered by the extending motion of the apparatus.

The film is pressed against the picture window only when the apparatus is in extended position. For this purpose a member 16 (Fig. 4) is arranged behind the lens 6. This member 16 formed as a plate is mounted in an opening in the inner body 1b. This opening extends in the direction of the axis of the lens. Thus, the number 16 is movable toward and away from the film 26. The outer body 1a has an inwardly extending projection 18 in such position that it lies opposite to the member 16 when the apparatus is extended. By means of a spring 17 said projection 18 then presses the plate 16 against the film, which is thus pressed against the picture window.

What I claim is:

1. A photographic apparatus for use of roll films comprising, in combination, a casing composed of two bodies telescopically reciprocable rectilinearly with respect to each other to extend and shut the casing; a lens having its axis perpendicular to the direction of reciprocation of said bodies, said lens being mounted in one of said bodies; a roll film feeding mechanism arranged in the same body as the lens; a shutter mounted in the body carrying the lens and movable before the lens; a spring permanently connecting the shutter with the body not carrying the lens; a spring-pressed catch mechanism located in the same body as the lens in position to engage the shutter when the two bodies are moved into their shut position and to tension the shutter mechanism as the two bodies are moved apart; and a member secured to the body on which the shutter is permanently connected in position for engaging and operating said film feeding mechanism as the two bodies are moved together into shut position.

2. A photographic apparatus for use of roll films comprising, in combination, a casing composed of two bodies telescopically reciprocable rectilinearly with respect to each other to extend and shut the casing; a lens having its axis perpendicular to the direction of reciprocation of said bodies, said lens being mounted in one of said bodies; a roll film feeding mechanism mounted in the same body as the lens; a shutter mounted in the body carrying the lens and movable before the lens; a spring permanently connecting the shutter with the body not carrying the lens; a catch mechanism located in the same body as the lens in position to engage the shutter when the two bodies are moved into their shut position and to tension the shutter mechanism as the two bodies are moved apart; a member secured to the same body to which the shutter is permanently connected in position for engaging and operating said film feeding mechanism as the two bodies are moved into shut position; and a plate mounted on the body to which the shutter is permanently connected and screening the lens when the two bodies are in shut position.

3. A photographic apparatus for use of roll films comprising, in combination, a casing composed of two bodies reciprocable rectilinearly with respect to each other to extend and shut the casing; a lens having its axis perpendicular to the direction of reciprocation of said bodies, said lens being mounted in one of said bodies; a roll film feeding mechanism mounted in the same body as the lens; a shutter mounted in the body carrying the lens and movable before the lens; a spring permanently connecting said shutter with the body not carrying the lens; a spring-pressed catch mechanism mounted in the same body as the lens in position to engage the shutter when the two bodies are moved into their shut position and to tension the shutter mechanism as the two bodies are moved apart; a member secured to the same body as the shutter in position to engage and operate said film feeding mechanism as the two bodies are moved in shut position; a view-finder in the body carrying the lens; and a plate mounted on the body to which the shutter is permanently secured in position to screen the view-finder when the two bodies are in shut position.

4. A photographic apparatus for use of roll films comprising, in combination, a casing composed of two bodies reciprocable rectilinearly with respect to each other to extend and shut the casing; a lens having its axis perpendicular to the direction of reciprocation of said bodies, said lens being mounted in one of said bodies; a roll film feeding mechanism mounted in the same body as the lens; a shutter mounted in the body carrying the lens and movable before the lens; a spring permanently connecting said shutter with the body in which the lens is not mounted; a spring-pressed catch mechanism mounted in the same body as the lens in position to engage the shutter when the two bodies are in shut position and to tension the shutter mechanism as the two bodies are moved apart; a member secured to the body with which the shutter is permanently connected in position to engage and operate said film feeding mechanism as the two bodies are moved together into shut position; the body carrying the lens having an opening located behind the lens and extending in the direction of the lens axis; a press member for pressing the film mounted in said opening; and a projection on the body to which the shutter is permanently connected for pressing said press member against the film and, thus, the film against the picture window only when the bodies are in extended position.

5. A photographic apparatus for use of roll films comprising, in combination, a casing composed of two bodies reciprocable rectilinearly with respect to each other to extend and shut the casing; a lens having its axis perpendicular to the direction of reciprocation of said bodies and mounted in one of said bodies; a roll film feeding mechanism mounted in the same body as the lens; a shutter mounted in the body carrying the lens and movable before the lens; a spring permanently connecting said shutter with the body not carrying the lens; a spring-pressed catch mechanism mounted in the same body as the lens in position to engage the shutter when the two bodies are in their shut position and to tension the shutter mechanism as the two bodies are moved to extended position; a member secured to the body to which the shutter is permanently connected to operate said film feeding mechanism as the two bodies are moved together into shut position; and a plate between the lens and the shutter, said plate being secured to the body to which the shutter is permanently connected in position to cover the lens in all relative positions of the two bodies except the most extended position.

WALTER ZAPP.